(12) United States Patent
Weinberg et al.

(10) Patent No.: US 8,294,747 B1
(45) Date of Patent: Oct. 23, 2012

(54) AUTOMATED INITIATION OF A COMPUTER-BASED VIDEO CONFERENCE USING A MOBILE PHONE TELEPHONY SESSION

(75) Inventors: David Weinberg, San Francisco, CA (US); Pradeep Sindhu, Los Altos Hills, CA (US); Luis Avila-Marco, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 423 days.

(21) Appl. No.: 12/568,181

(22) Filed: Sep. 28, 2009

Related U.S. Application Data

(60) Provisional application No. 61/225,458, filed on Jul. 14, 2009.

(51) Int. Cl.
*H04N 7/14* (2006.01)

(52) U.S. Cl. ............... 348/14.02; 348/14.08; 348/14.01; 455/556.1

(58) Field of Classification Search .... 348/14.01–14.16; 455/466, 403, 419, 414.1, 445, 567; 370/260–261; 709/204, 205
See application file for complete search history.

(56) References Cited

U.S. PATENT DOCUMENTS

| | | | |
|---|---|---|---|
| 6,750,896 B2 | 6/2004 | McClure | |
| 6,750,897 B1 * | 6/2004 | Moshrefi et al. | ........... 348/14.08 |
| 6,912,384 B2 | 6/2005 | Huomo et al. | |
| 7,161,914 B2 | 1/2007 | Shoaib et al. | |
| 7,433,699 B2 * | 10/2008 | Kohno et al. | ................. 455/466 |
| 7,567,269 B2 * | 7/2009 | Sakano et al. | ............. 348/14.01 |
| 7,979,059 B2 * | 7/2011 | Rockefeller et al. | ........ 455/414.1 |
| 2002/0118809 A1 | 8/2002 | Eisenberg | |
| 2004/0239754 A1 * | 12/2004 | Shachar et al. | ............ 348/14.08 |
| 2006/0203083 A1 | 9/2006 | Wilson, Jr. et al. | |
| 2007/0015536 A1 | 1/2007 | LaBauve et al. | |
| 2007/0130340 A1 | 6/2007 | Alperin et al. | |
| 2007/0220175 A1 * | 9/2007 | Khanna et al. | ................ 709/251 |
| 2008/0026752 A1 | 1/2008 | Flore et al. | |

OTHER PUBLICATIONS

Web site, Buchhorn et al., "VidMid Videoconferencing Workplan Scenarios for Videoconferencing," last modified Jan. 25, 2002, 7 pp., http://middleware.internet2.edu/video/draftdocs/draft-internet2-vidmid-vc-prioritized-workplan-scenarios-00.html.

* cited by examiner

*Primary Examiner* — Melur Ramakrishnaiah
(74) *Attorney, Agent, or Firm* — Shumaker & Sieffert, P.A.

(57) ABSTRACT

Techniques are described for initiating a video conference between two video conferencing devices by leveraging information obtained from two mobile phones that are engaged in a mobile phone session with one another and are each associated with a respective one of the video conferencing devices. A video conferencing device may obtain the information, including the telephone numbers for both mobile phones, using a Bluetooth connection between the mobile phone and the video conferencing device. A data center receives and maintains the mobile phone session information, determines whether each mobile phone engaged in the mobile phone session is associated with an available video conferencing device, and, if so, invites the associated video conferencing devices to initiate a video conference with one another.

41 Claims, 5 Drawing Sheets

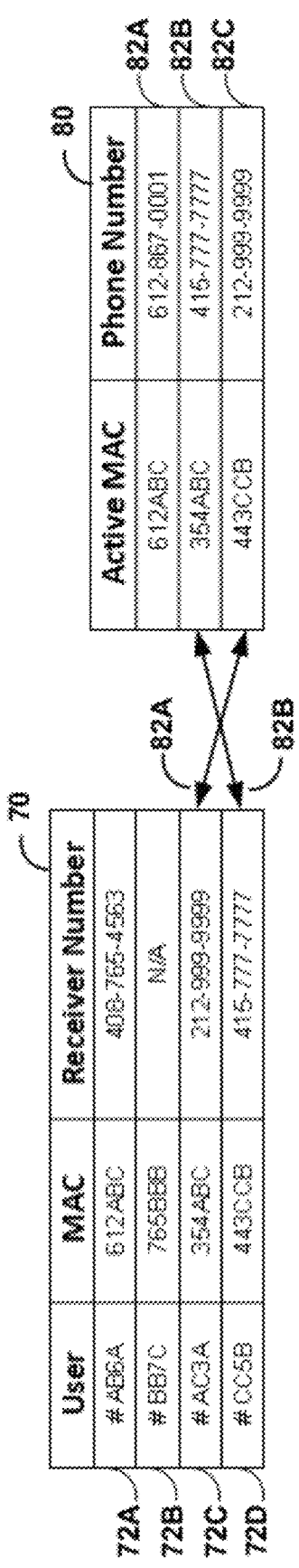
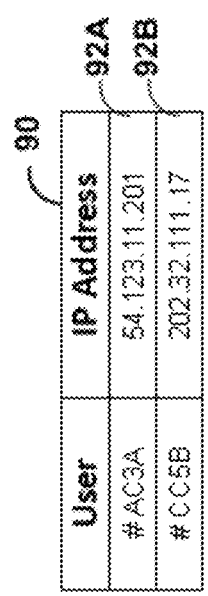
FIG. 3A
FIG. 3B

AUTOMATED INITIATION OF A COMPUTER-BASED VIDEO CONFERENCE USING A MOBILE PHONE TELEPHONY SESSION

This application claims the benefit of U.S. Provisional Application No. 61/225,458, filed Jul. 14, 2009, which is hereby incorporated by reference in its entirety.

TECHNICAL FIELD

The invention relates to video conferencing, and, more particularly, to initiating a computer-based video conference over a computer network.

BACKGROUND

Video conferencing permits two or more participants to remotely communicate using both audio and video signals. In one method of video conferencing, participants use a software application on a video conferencing device, such as a personal computer. Typically, capture devices connected to such a video conferencing device, such as cameras and microphones, acquire the speech and movements of a participant while simultaneously converting this information to audio and video streams, respectively. The software application obtains the streams from the capture devices, combines the streams into a multimedia stream, and then transmits the multimedia stream across a transmission medium to the one or more participants in the video conference. An application on a video conferencing device used by a receiving participant, in turn, accepts the multimedia stream and distributes its components to an audio device, such as a computer speaker, and a video display, such as a monitor.

Computer networks, such as the Internet, comprise an extensible, widely available, and low-cost transmission medium for video conferencing. Accordingly, video conferencing devices frequently connect directly to a computer network in order to exchange multimedia streams with other devices, similarly connected to the network and associated with remote participants, in order to enable a video conference. Conventional video conferencing across a computer network requires an initial configuration procedure in order to obtain identifying and/or routing information for the various participants. For example, before exchanging multimedia streams with a remote device across the Internet, a video conferencing device must first obtain the Internet Protocol (IP) address of the remote device.

SUMMARY

In general, the invention is directed to techniques for exploiting a mobile phone telephony session in order to automatically initiate a video conference between the session participants. More specifically, techniques are described by which a video conferencing device, while a mobile phone session is in progress, obtains information from a mobile phone regarding the identity and availability of other participants and, when appropriate, uses that information to initiate a video conference with the other participants.

For example, where two participants are communicating using mobile phones, a video conferencing device associated with a first participant may extract, using a short-range wireless connection to the phone of the first participant, information identifying both participants. Such information may include, for example, the respective phone numbers for the mobile phones. In addition, another video conferencing device associated with the second participant performs the same process with the phone of the second participant. The video conferencing devices, in cooperation with other devices on the network, may exchange the information that each has obtained from the respective mobile phones and determine that the associated participants are engaged in a mobile phone session with one another. The video conferencing devices may then automatically prompt the participants to instead engage in video conference with one another using the video conferencing devices.

In one embodiment, the invention is directed to a method for receiving, from a first video conferencing device, first mobile phone session information for a mobile phone session between a first mobile phone and a second mobile phone, wherein the first mobile phone session information comprises a first phone identifier associated with the first mobile phone and a second receiver number associated with the second mobile phone. The method further comprises receiving, from a second video conferencing device, second mobile phone session information for the mobile phone session, wherein the second mobile phone session information comprises a second phone identifier associated with the second mobile phone and a first receiver number associated with the first mobile phone. The method also comprises determining, from the first and second mobile phone session information, that the first mobile phone is engaged in a mobile phone session with the second mobile phone, and initiating a video conferencing session by directing the first video conferencing device to initiate a video conferencing session with the second video conferencing device.

In another embodiment, the invention is directed to a method of receiving, with a first video conferencing device, mobile phone session information for a mobile phone session between a first mobile phone and a second mobile phone, wherein the mobile phone session information comprises a first phone identifier associated with the first mobile phone and a second receiver number associated with the second mobile phone. The method also comprises initiating, in response to receiving the mobile phone session information, a video conferencing session with a second video conferencing device associated with the second mobile phone.

In another embodiment, the invention is directed to a method for establishing, with a first mobile phone, a mobile phone session with a second mobile phone, and establishing a communication link to a video conferencing device. The method further comprises sending phone registration information to the video conferencing device, wherein the phone registration information comprises a first phone identifier and a first phone number for the first mobile phone.

In another embodiment, the invention is directed to a system comprising one or more devices operating within a network to provide video conferencing services, one or more application servers, and a network interface. The network interface receives, from a first video conferencing device, first mobile phone session information for a mobile phone session between a first mobile phone and a second mobile phone, wherein the first mobile phone session information comprises a first phone identifier associated with the first mobile phone and a second receiver number associated with the second mobile phone. In addition, the network interface receives, from a second video conferencing device, second mobile phone session information for the mobile phone session, wherein the second mobile phone session information comprises a second phone identifier associated with the second mobile phone and a first receiver number associated with the first mobile phone, wherein the application servers determine, from the first and second mobile phone session information, that the first mobile phone is engaged in a mobile phone session with the second mobile phone, and wherein the application servers initiate a video conferencing session by directing the first video conferencing device to initiate a video conferencing session with the second video conferencing device.

In another embodiment, the invention is directed to a video conferencing device comprising a network interface that receives mobile phone session information for a mobile phone session between a first mobile phone and a second mobile phone, wherein the mobile phone session information comprises a first phone identifier associated with the first mobile phone and a second receiver number associated with the second mobile phone. The video conferencing device further comprises an application module that initiates, in response to receiving the mobile phone session information, a video conferencing session with a second video conferencing device associated with the second mobile phone.

In yet another embodiment, the invention is directed to a mobile phone configured to establish a mobile phone session with a second mobile phone and establish a communication link with a first video conferencing device. The mobile phone is further configured to send phone registration information to the first video conferencing device, wherein the phone registration information comprises a first phone identifier and a first phone number for the first mobile phone, and, after establishing the mobile phone session, send mobile phone session information to the first video conferencing device, wherein the mobile phone session information comprises the first phone identifier and a receiver number for the second mobile phone.

The techniques described herein may present several advantages. In many instances, a video conference may be more cost effective than a mobile phone session because it uses a computer network as a transmission medium rather than, for example, a cellular network that requires service fees and the like. Moreover, a video conference offers the ability to communicate visual information such as the facial expressions and body language of the various participants over and above the voice communication provided by mobile phones. Video conferencing thus offers the benefits of face-to-face communication.

Using information obtained from the mobile phone permits the video conferencing devices to automatically initiate a video conferencing session, thereby eliminating the need for participants to first perform a configuration procedure for the devices and otherwise reducing the effort required to participate in a video conference. In addition, automatically prompting mobile phone session participants informs or reminds them of the possibility of substituting the session with an immediate video conference with the same participants. These features increase the likelihood that a video conference will take place and that the benefits of such video conferencing will be realized.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 3A-3B include exemplary data structures having a number of records used by the video conferencing system of FIG. 2 in a manner consistent with the principles of the invention.

DETAILED DESCRIPTION

Figure 1:
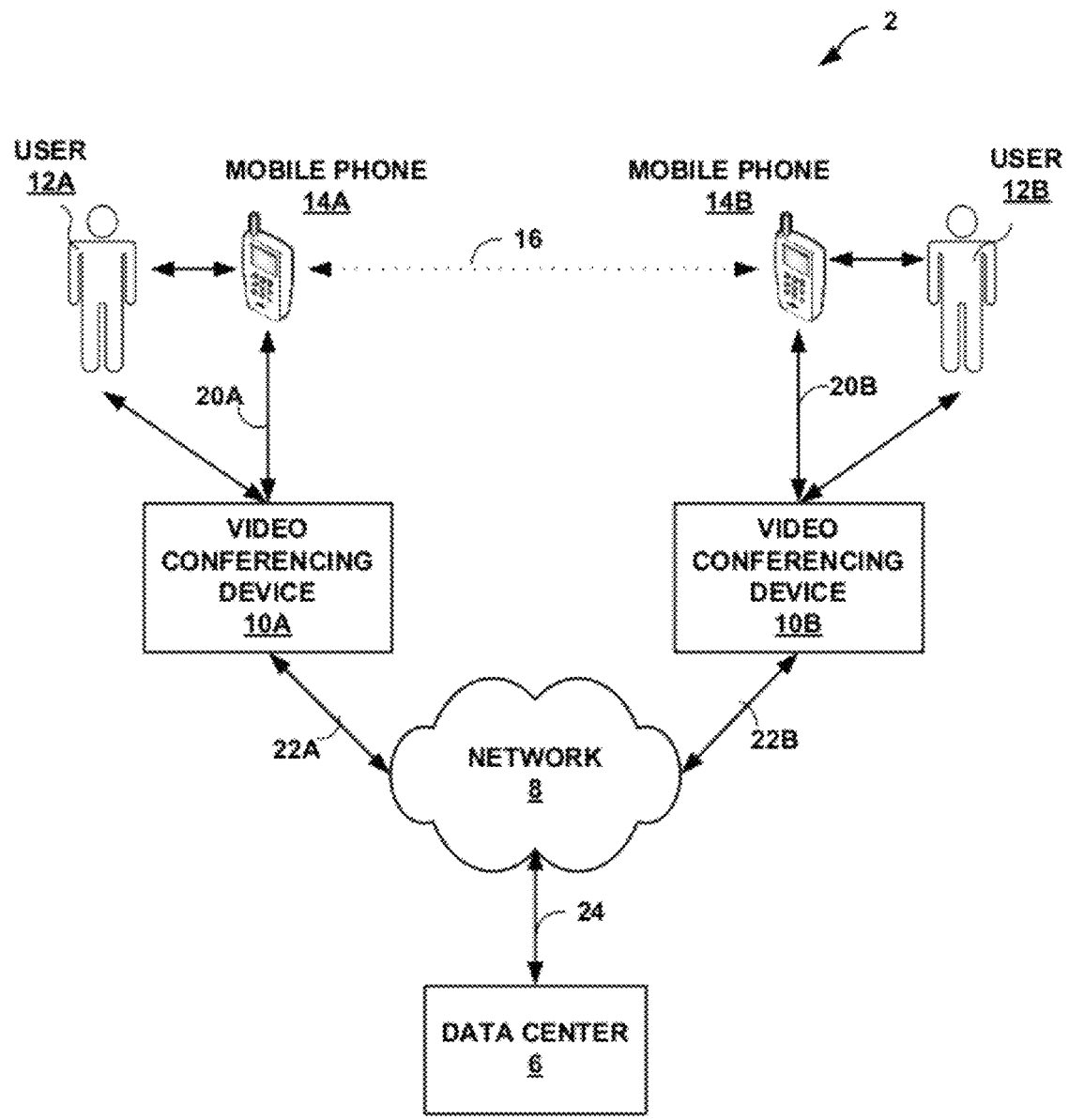
FIG. 1 is a block diagram illustrating an exemplary video conferencing system that initiates a video conference between two mobile phone session participants in a manner consistent with the principles of the invention.

FIG. 1 is a block diagram illustrating an exemplary system 2 that implements the video conference initiation techniques described in this disclosure. In the example of FIG. 1, system 2 includes two video conferencing devices 10A and 10B (collectively, "video conferencing devices 10") coupled to a network 8 via communication links 22A and 22B. Each of video conferencing devices 10 may be a personal computer, a laptop computer, a video conferencing suite, a digital television set-top box, a video game console, a personal digital assistant, or another type of device capable of interfacing with and communicating over a computer network 8. Each of video conferencing devices 10 provides one or more interface (e.g., display, speakers, keyboard, mouse, camera, microphone, and the like) with which respective users 12A and 12B ("users 12") interact to participate in a video conference.

Network 8 may include a plurality of network devices (not shown in FIG. 1) and intermediate networks that facilitates the transmission of multimedia streams and other information between video conferencing devices 10 and a video conference service provider, such as data center 6. The network devices may, for example, comprise routers, switches, servers, databases, hubs, firewalls gateways and/or any other type of networking equipment or device that facilitates the transfer of data among video conferencing devices 10 and data center 6.

Network 8 may transmit content to endpoint devices via one or more packet-based protocols, such as an Internet Protocol (IP)/Transmission Control Protocol (TCP). Multimedia streams are often packetized according to the Real-time Transport Protocol (RTP), which typically runs over the User Datagram Protocol (UDP). Through the use of these or similar protocols, network 8 may support the transmission of data via discrete data units, often referred to as "packets." As a result, network 8 may be referred to as a "packet-based" or "packet switched" network. While described in this disclosure as transmitting, conveying, or otherwise supporting packets, network 8 may transmit data according to any other discrete data unit defined by any other protocol, such as a cell defined by the Asynchronous Transfer Mode (ATM) protocol. The network devices in network 8 may also support a protocol, such as the Internet Group Management Protocol (IGMP), that facilitates multicasting.

In addition, network 8 may comprise a public network, such as the Internet, a private network, such as those owned and operated by an enterprise, or a combination of both public and private networks. Network 8 may further comprise one or more Wide Area Networks (WANs) or Local Area Networks (LANs), such as an Enterprise LAN/WAN, Virtual Local Area Networks (VLANs), Virtual Private Networks (VPNs), and/or any another type of network. In some instances for example, network 8 comprises a large public WAN, such as the Internet, over which a number of private networks owned by the same enterprise communicate to form a VPN. Thus, although shown as a single network 8 in FIG. 1, network 8 may comprise any number of interconnected networks, either public or private, in which the various networks interconnect to form various virtual networks.

System 2 further includes mobile phones 14A and 14B (collectively, "mobile phones 14"). Each of mobile phones 14 is typically a cellular telephone, which may be a smart telephone such as a Blackberry, manufactured by Research in Motion of Waterloo, Canada, or an iPhone, manufactured by Apple Computer of Cupertino, Calif. Other examples of mobile phones 14 may include a satellite telephone, radio telephone, and mobile Voice over Internet Protocol (VoIP) telephone. Users 12 make and receive telephone calls to other telephones using a respective one of mobile phones 14. In the example of FIG. 1, users 12A and 12B are engaged in a mobile phone session 16, which may use the services of one or more wireless carriers separate from network 8. For instance, communication data for mobile telephone session 16 may traverse one or more cellular networks of a wireless carrier, where the cellular networks may include cellular towers, satellites, cellular telephone exchanges, or other devices that facilitate mobile phone sessions. In addition, communication data for mobile telephone session 16 may traverse the public switched telephone network (PSTN).

When one or more of mobile phones 14 moves into a region proximate one of video conferencing devices 10, the mobile phones and the proximate video conference device detect each other using an out-of-band RF protocol. Mobile phones 14 and video conferencing devices 10 then proceed to establish RF communication sessions, represented by communication links 20A and 20B (collectively, "communication links 20"). In the example of FIG. 1, each of communications links 20 is a short-range radio link operating according to the Bluetooth wireless protocol. However, a communication link 20 may be another type of wireless link, such as an infrared or long-range radio link, and may in some instances be a wired link, such as a docking station or Universal Serial Bus (USB) cable.

Because communication links 20 are Bluetooth connections, changing conditions may cause either of communications links 20 to disconnect. For example, a class 2 Bluetooth device has an approximate range of 10 meters (~32 feet). If, for example, user 12A takes mobile phone 14A beyond 10 meters from video conferencing device 10A, communication link 20A is severed (i.e., unavailable). However, when user 12A returns mobile phone 14A within range of video conferencing device 10A, communication link 20A may be reestablished (i.e., available). Other conditions, such as walls, environmental conditions, and the configuration and status of the mobile phones 14 and video conferencing devices 10 may also affect the availability of communication links 20.

Consistent with the principles of the invention, video conferencing devices 10 receive, via communication links 20, information from associated mobile phones 14. Such information may include, for example, identifiers for one of mobile phones 14, as well as information regarding mobile phone session 16, such as the telephone numbers for mobile phones 14A and 14B. In the example of FIG. 1, video conferencing device 10A receives the telephone number for mobile phone 14A, as well as the telephone number of mobile phone 14B with which mobile phone 14A is currently engaged in mobile phone session 16. Similarly, video conferencing device 10B receives the telephone number for mobile phone 14B, as well as the telephone number of mobile phone 14A with which mobile phone 14B is engaged in mobile phone session 16. Information received by video conferencing devices 10 may also relate to the status of mobile phone session 16, such as whether the mobile phone session 16 has been dropped as a result of, for example, the parties completing their call. In addition, when one of mobile phones 14 moves beyond the Bluetooth range for the associated one of video conferencing device 10, the associated video conferencing device 10 may record the unavailability of the respective one of communication links 20.

Video conferencing devices 10 transmit to data center 6 via network 8 the information received from mobile phones 14. Data center 6 provides a video conference service for end-user devices such as video conferencing devices 10. Data center 6 may, for example, mediate connections and initiate video conferences between video conferencing devices 10, store context information for a video conference, store profile information for users 12, and provide other services. Data center 6 is connected to network 8 via communication link 24. Communicating with video conferencing devices 10 over packet-based network 8 permits data center 6 to be separate and remote from video conferencing devices 10. That is, data center 6 is generally a device or collection of devices that is not directly connected to either of video conferencing devices 10 and may be located a significant distance from the video conferencing devices. Data center 6 may be a high-end server, a personal computer, a laptop computer, a file server, an intermediate network device, a network appliance, a mainframe computer, a mobile phone, or other type of device or collection of such devices.

Data center 6 receives the transmitted information from video conferencing devices 10 and records the information in one or more databases on data center 6 (not shown in FIG. 1). As described in detail below, data center 6, after receiving and recording information from both video conferencing devices 10 regarding mobile phone session 16, determines that the mobile phones 14A and 14B are engaged in a mobile phone session with one another and, further, have a Bluetooth connection to associated video conferencing devices 10. Data center 6 therefore sends, via network 8, messages directing both video conferencing devices 10 to prompt respective users 12 to establish a video conferencing session with one another. In some embodiments users 12 need not even be prompted. In any event, video conferencing devices 10 use the information from mobile phones 14 and/or data center 6 to automatically initiate a video conference over network 8. Users 12 may, at this point, terminate the cellular telephony communication session between mobile phones 14.

Some embodiments of system 2 may forego a centralized data center 6 and instead implement a partial or total peer-to-peer solution, whereby the logical structure and functionality of data center 6 is distributed, in part or in whole, among video conferencing devices 10 or among mobile phones 14. In some embodiments, the logical structure and functionality of data center 6 is distributed among one or more other network devices in network 8. In some embodiments, the functionality of data center 6 is distributed among mobile phones 14.

In some embodiments, video conferencing device 10 and/or data center 6 communicate using an Integrated Services Digital Network (ISDN) or other point-to-point service in addition to or instead of a packet-based network. For example, while video conferencing devices 10 may communicate with data center 6 using network 8, video conferencing devices 10 may communicate with one another via a circuit-switched connection established via an ISDN.

Figure 2:
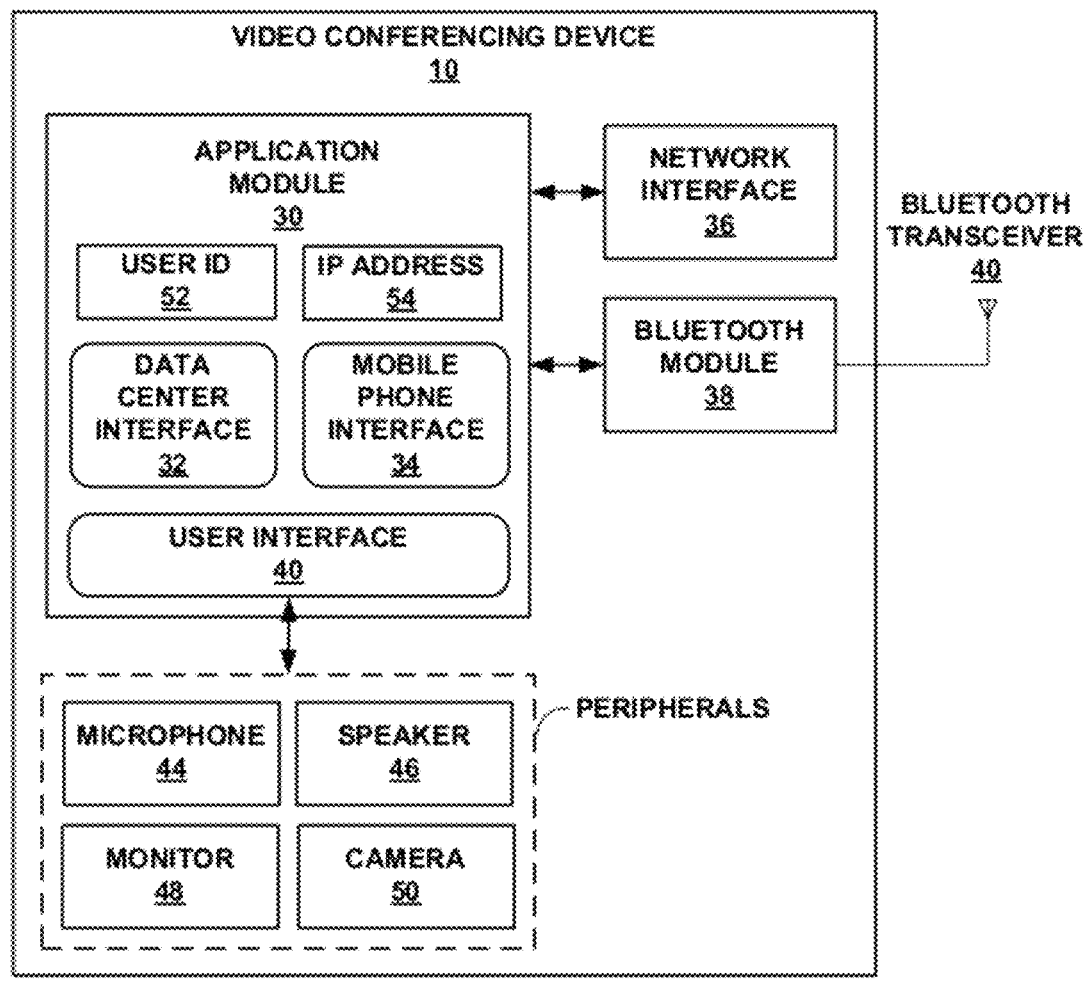
FIG. 2 is a block diagram illustrating an exemplary embodiment of a video conferencing device that implements the video conference initiation techniques described in this disclosure.

FIG. 2 is a block diagram illustrating, in further detail, an example embodiment of a video conferencing device 10 that cooperates with data center 6 to automatically initiate a video conference in accordance with the principles of the invention. In this example, video conferencing device 10 includes application module 30, which manages video conferencing functionality and the video conferencing initiation techniques described herein for video conferencing device 10. Application module 30 comprises data center interface 32, mobile phone interface 34, user interface 40, user identifier 52 ("user ID 52"), and Internet Protocol address 54 ("IP address 54"). User ID 52 is a number, string, or other token that uniquely identifies video conferencing device 10 or the current user of video conferencing device 10. IP address 54 is a logical address that specifies the routing location of video conferencing device 10 on network 8. User ID 52 and IP address 54 may be manually or dynamically configured. In one example, application module 30 is application software executing on video conferencing device 10 and includes all functionality for managing the video conferencing capabilities of the device. In this example, application module 30 has been extended to include the additional functionality described herein. Exemplary video conferencing devices capable of establishing a video conference over a packet-based network include equipment provided by Polycomm® of Pleasanton, Calif. or general purpose computers executing software applications that support video conferencing utilizing Voice over the Internet Protocol (VoIP), such as software applications provided by Skype Technologies S.A of Luxembourg.

Video conferencing device 10 includes hardware, firmware and/or software, and may include discrete hardware circuitry such as application-specific integrated circuits (ASICs), as well as processors, control units, or other logic for executing instructions fetched from computer-readable media. Examples of such media include hard disks, Flash memory, random access memory (RAM), read-only memory (ROM), non-volatile random access memory (NVRAM), electrically erasable programmable read-only memory (EEPROM), flash memory, and the like.

Video conferencing device 10 further includes peripheral devices, in particular microphone 44, speaker 46, monitor 48, and camera 50. The peripheral devices permit application module 30 and, by extension, video conferencing device 10 to interact aurally and visually with a user via user interface 40. In some embodiments, video conferencing device 10 may include alternative combinations of these or other peripherals. For example, video conferencing device 10 may not include audio devices such as speaker 46 and microphone 44. As another example, video conferencing device 10 may use a television, a projector, a PDA display, or other device for displaying video information to a user. In some embodiments, video conferencing device 10 may also include peripherals that transmit and receive tactile or other sensory information during a video conference in addition to, or in alternative to, audio/video information.

Application module 30 transmits and receives network packets using network interface 36, which may include a network interface card (NIC) or other network interface device. Network interface 36 may, for example, implement a full TCP/IP stack as components of an operating system executed by video conferencing device for sending and receiving packetized data through the NIC.

During a video conferencing session, application module 30 receives audio and video streams from microphone 44 and camera 50, respectively, via user interface 40. That is, microphone 44 and camera 50 typically output signals representative of captured audio and video, respectively. Corresponding software drivers executed by the operating system of video conferencing device 10 typically interact with hardware associated with the devices to process the signals and produce a digitized data stream accessible to application module 30. Application module 30 may manipulate the data streams, for example by combining and compressing the streams into a lower-resolution multimedia stream, before sending the multimedia stream to network interface 36 for packetization and transmission to a video conferencing device associated with another video conference participant. Similarly, network interface 36 receives multimedia packets from other video conferencing devices, reconstructs the multimedia packets into a multimedia stream, and forwards the multimedia stream to application module 30. Application module 30 may decompress and separate the multimedia stream into audio and visual components before sending the component streams to speaker 46 and monitor 48, respectively, via user interface 40 and the software drivers of the underlying operating system.

Data center interface 32 is generally client software executed by video conferencing device 10 for remotely accessing an application server running on data center 6. For example, data center interface 32 formulates and delivers database queries and other information from application module 30 to data center 6 via network interface 36. In addition, data center interface 32 receives commands and may otherwise interact with data center 6 in order to implement the techniques of the invention. As one example, data center interface 32 registers video conferencing device 10 with data center 6 by sending user ID 52 and IP address 54 to data center 6. In this way, data center 6 may associate user ID 52 with IP address 54. Video conferencing device 10 registration typically occurs as part of a handshaking process between data center interface 32 and data center 6 intended to facilitate communication over network 8. In some embodiments, data center interface 32 registers video conferencing device 10 in response to a particular event, such as the establishment of communication with a mobile phone, e.g., via a Bluetooth connection.

Mobile phone interface 34 mediates communication between application module 30 and one or more mobile phones 14, e.g., by way of Bluetooth module 48 and Bluetooth transceiver 40. Bluetooth module 48 represents hardware and/or software to enable video conferencing device 10 to establish a Bluetooth connection with mobile phones 14 or other Bluetooth-capable devices. When a Bluetooth connection is available, mobile phone interface 34 may send and receive information to/from Bluetooth-capable mobile phones 14 via Bluetooth module 48. Bluetooth module 48 and Bluetooth transceiver 40 cooperate to send and receive the information as radio signals according to the Bluetooth short-range wireless protocol. As explained above, in some embodiments, video conferencing device 10 may use other methods of communicating with mobile phones 14 instead of Bluetooth.

Upon establishing a Bluetooth connection to a mobile phone 14, mobile phone interface 34 requests mobile phone registration information in the form of the Media Access Control (MAC) address and the phone number for the mobile phone 14. In some embodiments, the identifier is an Internet Protocol (IP) address for the mobile phone 14 or other type of identifier. Linking the MAC address of a mobile phone 14 to the phone number for the mobile phone 14 may prevent spoofing. In some embodiments, however, the identifier is merely the phone number for mobile phone 14. In these instances, mobile phone interface 34 receives only the phone number of the mobile phone 14 as registration information. In some embodiments, mobile phone 14 initiates registration with video conferencing device 10 by independently sending the mobile phone registration information for mobile phone 14 to the video conferencing device.

After mobile phone interface 34 receives the mobile phone registration information, data center interface 32 forwards the mobile phone registration information to data center 6 to inform data center 6 that the video conferencing device 10 is currently within communication range of the mobile phone 14, e.g., via a Bluetooth connection. In some embodiments, when the Bluetooth connection between video conferencing device 10 and mobile phone 14 is dropped, data center interface 32 similarly informs data center 6 of the status of the Bluetooth connection in a message. In this manner, data center 6 may determine from its records the video conferencing devices 10 that have active Bluetooth connections to associated mobile phones 14.

When a mobile phone 14 associated with video conferencing device 10 is engaged in a mobile phone session and the mobile phone 14 has a Bluetooth connection to video conferencing device 10, mobile phone interface 34 requests information related to the mobile phone session. In response, mobile phone 14 sends information for the other party of the current mobile phone session (e.g., the MAC address for the mobile phone 14 and the receiver telephone number for the other party). For example, mobile phone 14A engaged in a mobile phone session with mobile phone 14B, in response to an information request from mobile phone interface 34, sends the MAC address for mobile phone 14A and the receiver telephone number (i.e., the telephone number for mobile phone 14B). In some instances, mobile phone interface 34 sends a request when mobile phone 14 is engaged in a mobile phone session and mobile phone 14 then enters the effective Bluetooth range for video conferencing device 10 and establishes a Bluetooth connection. In other instances, mobile phone 14 and video conferencing device 10 may already have a Bluetooth connection, whereupon mobile phone interface 34 sends a request after a user 12 employs mobile phone 14 to make a call and create a mobile phone session. In some embodiments, a request for mobile phone session information by mobile phone interface 34 is unnecessary as mobile phone 14 may send the session information to mobile phone interface 34 unprompted.

In accordance with the principles of the invention, upon receiving mobile phone session information, mobile phone interface 34 forwards the information to data center interface 32. Data center interface 32 then sends the MAC address and receiver telephone number of the mobile phone session information, along with the user ID 52 for video conferencing device 10, to data center 6 via network interface 36. Data center interface 32 may send these values to data center 6 as part of a database query or other communication. As described in detail below, data center 6 uses these values to first identify the video conferencing devices 10 associated with the mobile phone session participants and then to initiate a video conferencing session between video conferencing devices 10.

After sending the user ID 52 and mobile phone session information, data center interface 32 may receive in response a video conference initiation message from data center 6 via network interface 36, where the video conference initiation message directs video conferencing device 10 to establish a video conferencing session with another video conferencing device. For example, video conferencing device 10A may receive, from data center 6, a message directing video conferencing device 10A to initiate a video conferencing session with video conferencing device 10B. This message indicates that data center 6 determined that video conferencing device 10A and 10B are associated with respective users 12 that are currently engaged in a mobile phone session with one another. The message from data center 6 may take the form of one or more TCP/IP packets that contain application layer messages in accordance with the HTTP protocol or other application-layer protocol. The application-layer data within payloads of the TCP/IP packets may specify an Internet Protocol (IP) address or other routing information for video conferencing device 10B for use by video conferencing device 10A in establishing the video conference.

In response to the video conference initiation message from data center 6, data center interface 32 extracts the necessary information from the application layer data and forwards the information (e.g., the IP address for the other video conferencing device, the port number, quality of service parameters, VoIP parameters, and the like) to application module 30 and directs application module 30 to initiate a video conference with the other video conferencing device in accordance with the information. Application module 30 uses the IP address for the other video conferencing device to confirm the reachability and availability of the other video conferencing device via network 8. Application module 30 further sends a video conference alert, via user interface 40, to a user 12 associated with video conferencing device 10 informing the user 12 of the availability of a video conferencing session with the other participant in the mobile phone session with which user 12 is currently engaged. The alert may be, for example, a pop-up message on monitor 48, a sound made by speaker 46, or a combination of such alerts. In some embodiments, application module 30 directs mobile phone interface 34 to send a Short Messaging Service (SMS) text message or other indicator (e.g., a beep, ring, or image) to a mobile phone 14 as a video conference alert. Mobile phone interface 34 may cooperate with other applications and/or a wireless carrier in order to send a video conference alert to a mobile phone 14. In some embodiments, application module 30 alerts associated user 12 by automatically establishing a video conferencing session with the other participant and outputting the video conference to monitor 48 and speaker 46.

In addition to or as part of an alert, application module 30 may prompt associated user 12 for permission to establish a video conferencing session with the other participant. A requesting prompt may be, for example, a dialog box shown on monitor 48 that has a button that user 12 may press in order to accept a video conferencing session. If user 12 accepts the request, application module 30 waits for a message from the other video conferencing device indicating that the other participant has also accepted. Once both user 12 and the other participant have accepted, application module 30 establishes a video conferencing session across network 8 with the other video conferencing device, and user 12 engages in a video conference. In some embodiments, application module 30 may automatically establish a video conferencing session without prompting or otherwise requesting the participation of user 12. In some embodiments, application module 30 may establish a video conferencing session after either user 12 or the other participant accepts, rather than waiting for both to accept.

Once user 12 is participating in a video conference, user 12 may mute or disconnect associated mobile phone 14. User 12 may optionally use mobile phone 14 for voice communication while using the video conference for visual communication only.

If user 12 takes associated mobile phone 14 outside of the effective Bluetooth range of video conferencing device 10, user 12 is likely no longer near video conferencing device 10. Accordingly, mobile phone interface 34 may direct application module 30 to terminate the video conference.

FIG. 3A illustrates example data structures maintained by data center 6 (FIG. 1) for facilitating the automated initiation of a video conference from a detected mobile phone session. In this example, the example data structures include mobile phone session table 70 and mobile phone registry table 80 for data center 6. Mobile phone session table 70 includes mobile phones session records 72A-72D (collectively, "session records 72"). Each of session records 72 corresponds to mobile phone session information obtained by one of video conferencing devices 10 and sent to data center 6 in the manner described above. Accordingly, each of session records 72 has data stored within user, MAC, and receiver number fields. The user field identifies the video conferencing device 10, or a user 12 currently associated with the video conferencing device 10, that generated the session record. The MAC field identifies the one of mobile phones 14 that is associated with the video conferencing device 10 identified in the user field. Finally, for each of mobile phone session records 72, the value in the receiver number field is the telephone number of the other one of mobile phones 14 that, together with the one of mobile phones 14 identified by the value in the MAC field, is engaged in the mobile phone session corresponding to the mobile phone session record. In some embodiments, mobile phone session table 70 may have fields specifying other identifiers in addition to, or in place of, the fields illustrated in mobile phone session table 70. For example, mobile phone session table 70 may include a field that specifies a Skype ID for a user 12.

Mobile phone registry table 80 comprises mobile phone registration records 82A-82C (collectively, "mobile phone registration records 82"). Each of mobile phone registration records 82 corresponds to mobile phone registration information sent by a mobile phone 14 and forwarded by an associated video conferencing device 10 to data center 6. As described above, a mobile phone registration record 82 for a mobile phone 14 indicates that mobile phone 14 has a Bluetooth connection to an associated one of video conferencing devices 10. Each of mobile phone registration records 82 includes values for the active MAC and phone number fields. The value in the phone number field is the telephone number for the one of mobile phones 14 having the MAC address specified in the active MAC field. In some embodiments, mobile phone registry table 80 may have fields specifying other identifiers in addition to, or in place of, the fields illustrated in mobile phone registry table 80. For example, mobile phone registry table 80 may include a field that specifies a Skype ID.

Arrow 82A highlights session record 72C and registration record 82C having matching receiving number and phone number fields, respectively. Similarly, arrow 82B highlights session record 72D and registration record 82B having matching receiving number and phone number fields, respectively. As described in detail below, these matching numbers indicate that the mobile phones 14 specified by session records 72C and 72D are engaged in a mobile phone session with one another.

FIG. 3B illustrates an additional data structure for data center 6. As shown, data center 6 further maintains video conferencing device registration table 90 having records 92A-92B (collectively, "entries 92"). Each of records 92 has values for the user and IP address fields that correspond to video conferencing device registration information sent by a video conferencing device 10 to data center 6, as described above. Accordingly, for each of records 92, the value of the IP address field is the IP address for the video conferencing device 10 identified by the value of the user field (i.e., the user ID for the video conferencing device 10).

Figure 4:
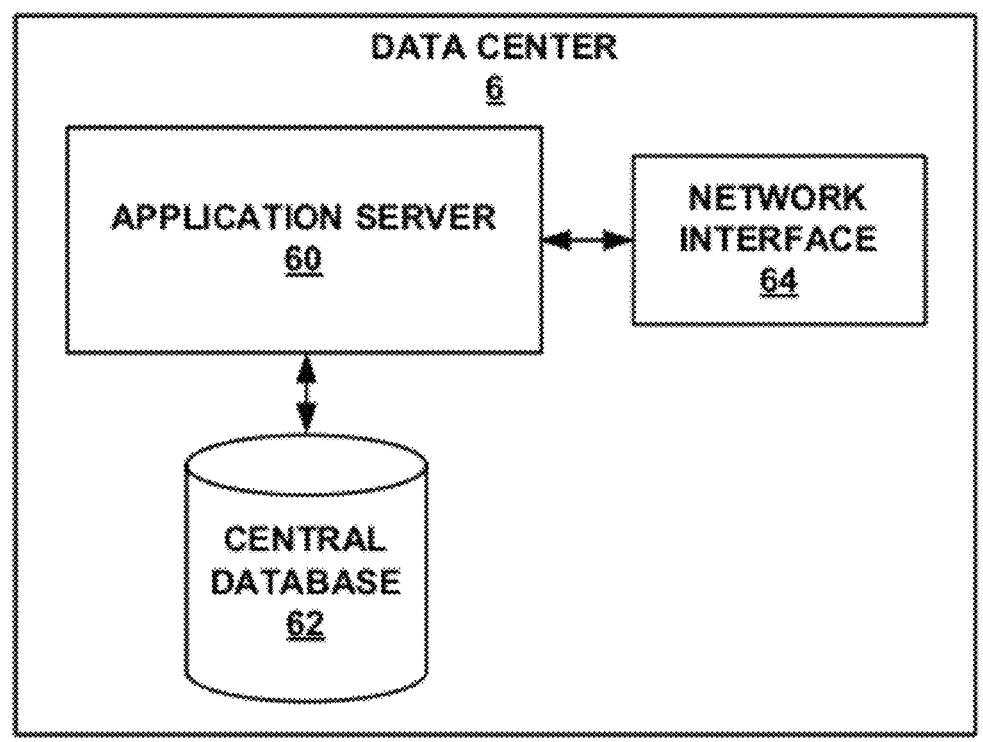
FIG. 4 is block diagram illustrating an exemplary embodiment of a data center that implements the video conference initiation techniques described in this disclosure.

FIG. 4 is block diagram illustrating, in further detail, an example embodiment of a data center 6 that cooperates with video conferencing devices 10 of system 2 to automatically initiate a video conference in accordance with the principles of the invention. Data center 6 includes one or more application servers 60 coupled to one or more database servers that operate to maintain a central database 62. Further, data center 6 includes a network interface 64, which may be front-end hardware associated with a high-speed network connection, such as a T3 connection to an Internet Service Provider (ISP). The components of data center 6 as shown in FIG. 4 are typically interconnected by high-speed switching fabric and network infrastructure, such as firewalls, routers, gateways, intrusion detection and prevention (IDP) systems and the like.

The individual devices of data center 6 generally each include hardware, firmware and/or software, and may include discrete hardware circuitry such as application-specific integrated circuits (ASICs), as well as processors, control units, or other logic for executing instructions fetched from computer-readable media. Examples of such media include hard disks, Flash memory, random access memory (RAM), read-only memory (ROM), non-volatile random access memory (NVRAM), electrically erasable programmable read-only memory (EEPROM), flash memory, and the like.

Central database 62 maintains data records for system 2 in data structures similar mobile phone registry table 80 and mobile phone session table 70 of FIG. 3A, as well as video conferencing device registration table 90 of FIG. 3B. Central database 62 may maintain data records as tables, linked lists, trees, databases, flat files, or any other data structures. Central database 62 may include one or more database servers executing enterprise database software, such as Microsoft SQL Server, published by Microsoft Corp. of Redmond, Wash., or the Oracle relational database management system, published by Oracle Corp. of Redwood Shores, Calif. In such instances, central database 62 accepts database queries (e.g., SQL queries) to insert, find, and manipulate data records.

Application server 60 may be, for instance, a Java Enterprise Edition (J2EE) application server such as WebSphere or Apache, a Microsoft application server running on the Microsoft .NET platform, or other type of software. Application server 60, via network interface 64, receives and records information in central database 62 as the information is sent by video conferencing devices 10. For example, application server 60 may receive mobile phone registration information and record this information in mobile phone registry table 80.

In addition, application server 60 includes one or more software and/or hardware modules to match records in central database 62 in order to determine whether any two or more mobile phones 14 are engaged in a mobile phone session with one another. In some embodiments, application server 60 may leverage central database 62 to manipulate data records for the purpose of record matching.

Application server 60 receives mobile phone registration information from video conferencing devices 10, which, as described above, indicates that a mobile phone 14 has a Bluetooth connection with a video conferencing device 10. Application server 60 may record this information in mobile phone registry 80. In addition, application server 60 may receive information from video conferencing device 10 indicating that a Bluetooth connection to an associated mobile phone 14 has been dropped. In such instances, application server 60 may remove the mobile phone 14 from the mobile phone registry 80.

When application server 60 receives mobile phone session information from video conferencing device 10A, application server 60 first records the information in mobile phone session table 70. In accordance with the principles of the invention, application server 60 performs a reverse lookup in mobile phone registry table 80 using the receiver number value of the session information. That is, application server 60 determines whether there is a mobile phone registration record 82 in mobile phone registry 80 having a telephone number that matches the receiver number for the mobile phone session information. A matching telephone number indicates that there is a current mobile phone session between the mobile phone 14A associated with video conferencing device 10A and another mobile phone 14B that is currently registered (i.e., has a Bluetooth connection to a video conferencing device).

In addition, application server 60 performs a second reverse lookup using the MAC address from the active MAC field of the matching mobile phone registration record 82.

Application server compares this MAC address to the values for the MAC field in mobile phone session records 72 of mobile phone session table 70. The mobile phone session record 72 having a matching MAC value specifies the user ID of video conferencing device 10B associated with mobile phone 14B. Application server 60 received the user ID of the video conferencing device 10A when it received the mobile phone session information from video conferencing device 10A. Application server 60 therefore has user IDs for both video conferencing devices 10A and 10B and may initiate a video conferencing session. Failure to find a matching MAC value in the MAC field of mobile phone session records 72 may indicate that video conferencing device 10B has not sent mobile phone session information to data center 6. In such instances, application server 60 may end the reverse lookup process. Upon receiving corresponding mobile phone session information from video conferencing device 10B, application server 60 restarts the reverse lookup process. In some embodiments, application server 60 may hold the reverse lookup process already in progress and continue the process after receiving corresponding mobile phone session information from video conferencing device 10B.

To initiate a video conferencing session, application server 60 uses the user IDs for video conferencing devices 10A and 10B to lookup, in video conferencing device registration table 90, the recorded IP addresses for video conferencing devices 10A and 10B. Application server 60 sends a message to either or both video conferencing devices 10A and 10B directing the video conferencing devices to initiate a video conferencing session with one another. The message to a video conferencing device includes the IP address of the other video conferencing device. For example, the message from application server 60 to video conferencing device 10A includes the IP address of video conferencing device 10B. As described in detail above, video conferencing device 10A may use the IP address to contact video conferencing device 10B and initiate a video conferencing session.

For some embodiments, the reverse lookup and other database operations may be a database or other procedure triggered by the insertion, by application server 60, of a mobile phone session record 72 into mobile phone session table 70. For example, the operations may be implemented as one or more database queries to central database 62. In some embodiments, application server 60 performs the reverse lookup operation periodically (e.g., once every minute) or in response to other events.

In some embodiments, as described above, the logical structure and functionality of data center 6 is distributed, in part or in whole, among video conferencing devices 10. For example, the data records in central database 62 may be distributed among distributed databases in video conferencing devices 10. As another example, a video conferencing device 10A may perform the reverse lookup operations by requesting and analyzing data records from a central or distributed database.

For some embodiments, the logical structure and functionality of data center 6 is distributed to one or more other network devices in network 8. For example, network 8 may implement a Virtual Private LAN Service (VPLS) to provide Ethernet communication among separate LANs. Such Ethernet communication may be provided by Multiprotocol Label Switching (MPLS), for example. In such instances, the MAC addresses for mobile phones 14 may be distributed to the VPLS tables, for a VPLS instance, of network devices in network 8, such as routers, in addition or instead of to data center 6. In this way, a service provider (SP) may guarantee certain a quality of service (QoS) for a video conferencing session between video conferencing devices 10.

For some embodiments, the logical structure and functionality of data center 6 is distributed to either or both mobile phones 14. For such embodiments, the mobile phones 14 directly communicate, across a mobile phone session, the Bluetooth connection status of the respective mobile phone 14 to an associated video conferencing device 10. In addition, a mobile phone 14 receives, from an associated video conferencing device 10, routing location information for the video conferencing device, such as an IP address. By performing the methods described herein with reference to data center 6, a mobile phone 14 may initiate a video conferencing session between video conferencing devices 10. For example, during a mobile phone session, mobile phone 14A may receive information from mobile phone 14B indicating the available status of the Bluetooth connection 20B between mobile phone 14B and video conferencing device 10B. Mobile phone 14A may further determine that there is an available Bluetooth connection 20A between mobile phone 14A and video conferencing device 10A. Accordingly, mobile phone 14A may request and receive the IP address for video conferencing device 10B from mobile phone 14B. Mobile phone 14A then forwards the IP address to video conferencing device 10A and directs video conferencing device 10A to initiate a video conferencing session with video conferencing device 10B in the manner described above. In this way, mobile phones 14 in this embodiment perform the functions of data center 6.

Figure 5:
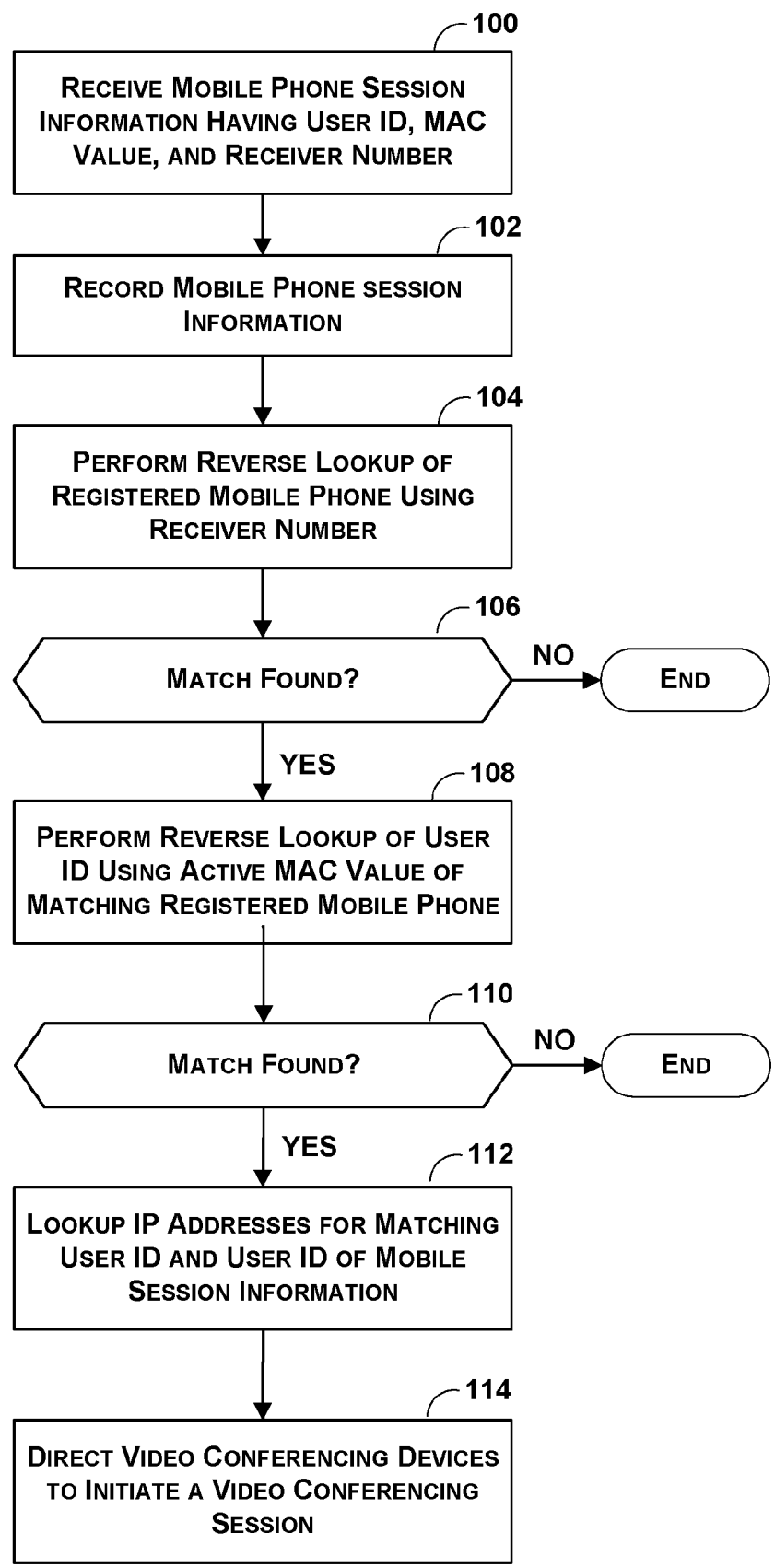
FIG. 5 is a flow chart illustrating an example mode of operation for a data center that performs the video conference initiation techniques described in this disclosure.

FIG. 5 is a flow chart illustrating an example mode of operation for data center 6. The following explication of the illustrated example mode of operation uses the tables and records of FIGS. 3A-3B as exemplary data records maintained by data center 6 in accordance with the principles of the invention.

Data center 6 receives mobile phone session information from video conferencing device 10A (100). The mobile phone session information includes the user ID of video conferencing device 10A, the MAC address of mobile phone 14A, and the receiver number (i.e., the telephone number for mobile phone 14B). Data center 6 records the mobile phone session information as mobile phone session record 72D in mobile phone session table 70 (102). Next, data center 6 uses the receiver number to perform a reverse lookup, in mobile phone registry table 80, to determine the MAC address of mobile phone 14B (104). In this example, data center 6 determines that mobile phone registry record 82B has a phone number value that matches the receiver number (YES branch of 106). The active MAC value of mobile phone registry record 82B, 354ABC, is the MAC address of mobile phone 14B. In some instances, data center 6 may determine that there are no matching mobile phone registry records, which ends the operation (NO branch of 106).

Using the active MAC value from mobile phone registry record 82B, data center 6 performs a reverse lookup on mobile phone session table 70 to determine the user ID of video conferencing device 10B that corresponds to mobile phone 14B (108). In this example, data center 6 determines that mobile phone session record 72C has a matching MAC value of 354ABC (YES branch of 110). In some instances data center 6 may determine that there are no matching mobile phone session records, which ends the operation (NO branch of 110).

Mobile phone session record 72C specifies that video conferencing device 10B, associated with mobile phone 14B, has a user ID of #A3CA. In addition, mobile phone session record 72D specifies that video conferencing device 10A has a user ID of #CC5B. Data center 6 queries video conferencing device registration table 90 using the respective user IDs of video conferencing devices 10A and 10B to obtain the IP addresses of the video conferencing devices 10A and 10B (112). Finally, data center 6 sends messages to video conferencing devices 10A and 10B directing them to initiate a video conferencing session (114).

Various embodiments of the invention have been described. These and other embodiments are within the scope of the following claims.

The invention claimed is:

1. A method comprising:
    detecting, by a first video conferencing device, a first mobile phone using short-range wireless communication;
    obtaining, by the first video conferencing device and from the first mobile phone using short-range wireless communication, first mobile phone session information for a mobile phone session between the first mobile phone and a second mobile phone, wherein the first mobile phone session information comprises a first phone identifier associated with the first mobile phone and a second receiver number associated with the second mobile phone;
    responsive to obtaining the first mobile phone session information, sending, by the first video conferencing device, the first mobile phone session information to a video conference service executing within a data center;
    detecting, by a second video conferencing device, the second mobile phone using short-range wireless communication;
    obtaining, by the second video conferencing device and from the second mobile phone using short-range wireless communication, second mobile phone session information for the mobile phone session, wherein the second mobile phone session information comprises a second phone identifier associated with the second mobile phone and a first receiver number associated with the first mobile phone;
    responsive to obtaining the second mobile phone session information, sending, by the second video conferencing device, the second mobile phone session information to the video conference service of the data center;
    determining, by the video conference service of the data center and based at least on the first and second mobile phone session information, that the first mobile phone is engaged in a mobile phone session with the second mobile phone; and
    responsive to determining that the first mobile phone is engaged in a mobile phone session with the second mobile phone, automatically initiating, by the video conference service of the data center, a video conferencing session by directing the first video conferencing device to initiate a video conferencing session with the second video conferencing device.

2. The method of claim 1,
    wherein the first and second video conferencing devices are separate and remote from the video conference service of the data center.

3. The method of claim 2, wherein sending the first and second mobile phone session information to the video conference service of the data center comprises sending the first and second mobile phone session information to the video conference service of the data center via a packet-based network.

4. The method of claim 2, wherein initiating a video conferencing session comprises sending, with the video conference service of the data center and via a packet-based network, a message to the first video conferencing device directing the first video conferencing device to initiate a video conferencing session with the second video conferencing device.

5. The method of claim 4, wherein the message comprises a network address of the second video conferencing device.

6. The method of claim 1, further comprising:
    sending, to the video conference service of the data center and by the first video conferencing device, first video conferencing device registration information comprising a first user identifier and an associated first network address for the first video conferencing device; and
    sending, to the video conference service of the data center and by the second video conferencing device, second video conferencing device registration information comprising a second user identifier and an associated second network address for the second video conferencing device,
    wherein the first mobile phone session information further comprises the first user identifier,
    wherein the second mobile phone session information further comprises the second user identifier, and
    wherein initiating a video conferencing session further comprises determining the first network address from the first video conferencing device registration information using the first mobile phone session information and determining the second network address from the second video conferencing device registration information using the second mobile phone session information.

7. The method of claim 6, further comprising:
    sending, to the video conference service of the data center and by the first video conferencing device, first phone registration information comprising the first phone identifier and a first phone number for the first mobile phone; and
    sending, to the video conference service of the data center and by the second video conferencing device, second phone registration information comprising the second phone identifier and a second phone number for the second mobile phone,
    wherein determining that the first mobile phone is engaged in a mobile phone session with the second mobile phone further comprises matching the second receiver number to the second phone number in the second phone registration information,
    wherein initiating a video conferencing session further comprises determining, using the second phone number, the second phone identifier from the second phone registration information, and
    wherein determining the second network address from the second video conferencing device registration information using the second mobile phone session information further comprises determining, using the second phone identifier, the second user identifier from the second mobile phone session information.

8. The method of claim 1, further comprising:
sending, to the video conference service of the data center and by the first video conferencing device, first phone registration information comprising a first phone number for the first mobile phone; and
sending, to the video conference service of the data center and by the second video conferencing device, second phone registration information comprising a second phone number for the second mobile phone,
wherein determining that the first mobile phone is engaged in a mobile phone session with the second mobile phone further comprises matching the second phone number and the second receiver number.

9. The method of claim 8,
wherein the first phone registration information indicates that the first video conferencing device and the first mobile phone have a first communication link, and
wherein the second phone registration information indicates that the second video conferencing device and the second mobile phone have a second communication link.

10. A method comprising:
receiving, with a first video conferencing device using short-range wireless communication, mobile phone session information for a mobile phone session between a first mobile phone and a second mobile phone, wherein the mobile phone session information comprises a first phone identifier associated with the first mobile phone and a second receiver number associated with the second mobile phone; and
initiating, in response to receiving the mobile phone session information, a video conferencing session with a second video conferencing device associated with the second mobile phone.

11. The method of claim 10, further comprising sending a user identifier and the mobile phone session information to a video conference service executing within a data center.

12. The method of claim 11, further comprising:
receiving, from the video conference service of the data center, a message comprising a command to initiate a video conferencing session with the second video conferencing device and a network address for the second video conferencing device,
wherein initiating a video conferencing session with the second video conferencing device comprises initiating a video conferencing session with the second video conferencing device in response to the command.

13. The method of claim 11, further comprising receiving, from the video conference service of the data center, a network address of the second video conferencing device.

14. The method of claim 10, wherein initiating a video conferencing session further comprising sending an alert to a user indicating the availability of the video conferencing session.

15. The method of claim 14, wherein sending an alert comprises sending a text message to the first mobile phone.

16. The method of claim 14, wherein the alert comprises a request for a user to establish a video conferencing session with the second video conferencing device.

17. A method comprising:
establishing, with a first mobile phone, a mobile phone session with a second mobile phone;
establishing a communication link to a video conferencing device using short-range wireless communication; and
sending phone registration information to the video conferencing device, wherein the phone registration information comprises a first phone identifier and a first phone number for the first mobile phone.

18. The method of claim 17, further comprising, after establishing the mobile phone session, sending mobile phone session information to the video conferencing device, wherein the mobile phone session information comprises the first phone identifier and a receiver number for the second mobile phone.

19. A system comprising:
a first video conferencing device;
a second video conferencing device;
one or more application servers operating within a data center coupled to a network to provide video conferencing services; and
a network interface for the data center that:
receives, from the first video conferencing device, first mobile phone session information for a mobile phone session between a first mobile phone and a second mobile phone, wherein the first mobile phone session information comprises a first phone identifier associated with the first mobile phone and a second receiver number associated with the second mobile phone; and
receives, from the second video conferencing device, second mobile phone session information for the mobile phone session, wherein the second mobile phone session information comprises a second phone identifier associated with the second mobile phone and a first receiver number associated with the first mobile phone,
wherein the first video conferencing device obtains, from the first mobile phone using short-range wireless communication, the first mobile phone session information,
wherein the second video conferencing device obtains, from the second mobile phone using short-range wireless communication, the second mobile phone session information,
wherein the application servers determine, from the first and second mobile phone session information, that the first mobile phone is engaged in a mobile phone session with the second mobile phone, and
wherein the application servers initiate a video conferencing session by directing the first video conferencing device to initiate a video conferencing session with the second video conferencing device.

20. The system of claim 19, wherein the first and second video conferencing devices are separate and remote from the application servers.

21. The system of claim 20, wherein the network interface receives the first and second mobile phone session information via a packet-based network.

22. The system of claim 20, wherein the application servers initiate a video conferencing session by sending, via the network interface, a message to the first video conferencing device directing the first video conferencing device to initiate a video conferencing session with the second video conferencing device.

23. The system of claim 22, wherein the message comprises a network address of the second video conferencing device.

24. The system of claim 19,
wherein the network interface:
receives, from the first video conferencing device, first video conferencing device registration information comprising a first user identifier and an associated first network address for the first video conferencing device; and receives, from the second video conferencing device, second video conferencing device registration information comprising a second user identifier and an associated second network address for the second video conferencing device, wherein the first mobile phone session information further comprises the first user identifier, wherein the second mobile phone session information further comprises the second user identifier, and wherein the application servers initiate a video conferencing session by determining the first network address from the first video conferencing device registration information using the first mobile phone session information and determining the second network address from the second video conferencing device registration information using the second mobile phone session information.

25. The system of claim 24,
wherein the network interface:
  receives, from the first video conferencing device, first phone registration information comprising the first phone identifier and a first phone number for the first mobile phone; and
  receives, from the second video conferencing device, second phone registration information comprising the second phone identifier and a second phone number for the second mobile phone,
wherein the application servers determine that the first mobile phone is engaged in a mobile phone session with the second mobile phone by further matching the second receiver number to the second phone number in the second phone registration information,
wherein the application servers initiate a video conferencing session by further determining, using the second phone number, the second phone identifier from the second phone registration information, and
wherein the application servers determine the second network address from the second video conferencing device registration information using the second mobile phone session information by further determining, using the second phone identifier, the second user identifier from the second mobile phone session information.

26. The system of claim 19,
wherein the network interface:
  receives, from the first video conferencing device, first phone registration information comprising a first phone number for the first mobile phone; and
  receives, from the second video conferencing device, second phone registration information comprising a second phone number for the second mobile phone.

27. The system of claim 26,
wherein the first phone registration information indicates that the first video conferencing device and the first mobile phone have a first communication link, and
wherein the second phone registration information indicates that the second video conferencing device and the second mobile phone have a second communication link.

28. The system of claim 19, further comprising:
one or more routers in the network that implement a Virtual Private Local Area Network Service (VPLS), wherein the routers comprise a VPLS table containing the first phone identifiers and a Quality of Service (QoS) policy for the first phone identifier;

wherein the first video conferencing device is in a first local area network and the second video conferencing device is in a second local area network, and
wherein, for a video conferencing session initiated by the application servers, the routers apply the QoS policy to the video conferencing session communications.

29. The system of claim 19, further comprising one or more databases, wherein the application servers store the first and second mobile phone information in the one or more databases.

30. A video conferencing device comprising:
a mobile phone interface that establishes and maintains a short-range wireless communication link with the first mobile phone, and receives mobile phone session information for a mobile phone session between a first mobile phone and a second mobile phone via the short-range wireless communication link, wherein the mobile phone session information comprises a first phone identifier associated with the first mobile phone and a second receiver number associated with the second mobile phone; and
an application module that initiates, in response to receiving the mobile phone session information, a video conferencing session with a second video conferencing device associated with the second mobile phone.

31. The video conferencing device of claim 30, further comprising a data center interface that sends a user identifier and the mobile phone session information to a video conference service executing within a data center.

32. The video conferencing device of claim 31,
wherein the data center interface receives, from the video conference service of the data center, a message comprising a command to initiate a video conferencing session with the second video conferencing device and a network address for the second video conferencing device, and
wherein the application module initiates a video conferencing session with the second video conferencing device in response to the command.

33. The video conferencing device of claim 31, wherein the data center interface receives a network address of the second video conferencing device.

34. The video conferencing device of claim 30, wherein the application module initiates a video conferencing session by sending an alert to a user indicating the availability of the video conferencing session.

35. The video conferencing device of claim 34, wherein sending an alert comprises sending a text message, via the mobile phone interface, to the first mobile phone.

36. The video conferencing device of claim 34, further comprising a user interface,
wherein sending an alert comprising sending a request, via the user interface, for a user to establish a video conferencing session with the second video conferencing device.

37. A mobile phone comprising:
an interface configured to establish a communication link with a first video conferencing device using short-range wireless communication; and
a processor configured to establish a mobile phone session with a second mobile phone,
wherein the processor is further configured to send phone registration information, comprising a first phone identifier and a first phone number for the first mobile phone, to the first video conferencing device via the interface.

38. The mobile phone of claim 37, wherein the mobile phone is further configured to, after establishing the mobile phone session, send mobile phone session information to the first video conferencing device, wherein the mobile phone session information comprises the first phone identifier and a receiver number for the second mobile phone.

39. The mobile phone of claim 37, wherein the mobile phone is further configured to:
    receive routing location information for the first video conferencing device from the first video conferencing device; and
    send the routing location information for the first video conferencing device to the second mobile phone.

40. The mobile phone of claim 39, wherein the mobile phone is further configured to send a message to the second mobile phone directing the second mobile phone to initiate, using the second video conferencing device, a video conferencing session with the video conferencing device.

41. The mobile phone of claim 37, wherein the mobile phone is further configured to: receive routing location information for a second video conferencing device from the second mobile phone;
    send the routing location information to first video conferencing device; and
    send a message to the first video conferencing device directing the first video conferencing device to initiate a video conferencing session with the second video conferencing device.

* * * * *